Aug. 25, 1942.  F. BURCHELL  2,293,696
METHOD OF MAKING DESIGNS
Filed March 29, 1940  3 Sheets-Sheet 1
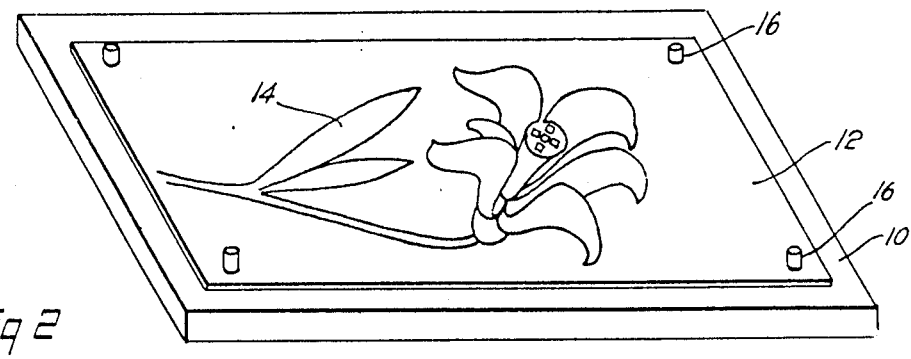
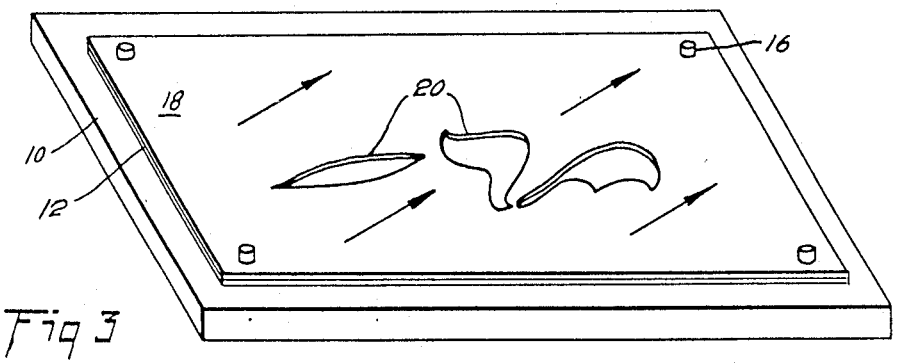
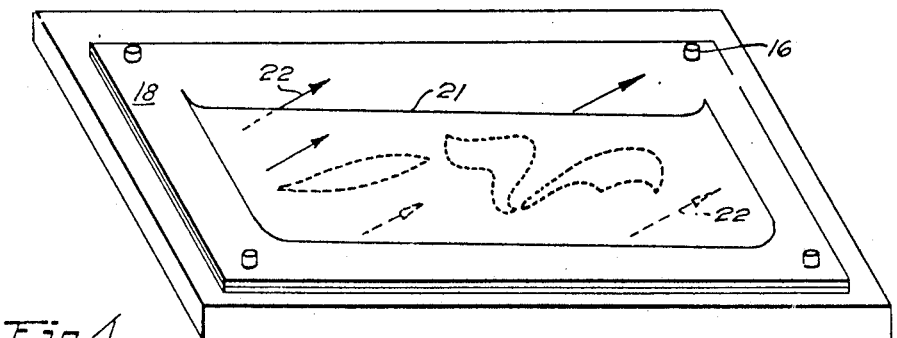
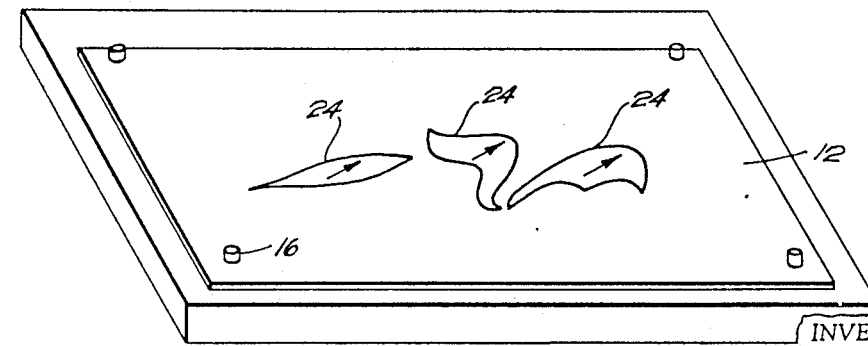

Aug. 25, 1942.   F. BURCHELL   2,293,696
METHOD OF MAKING DESIGNS
Filed March 29, 1940   3 Sheets-Sheet 2

Aug. 25, 1942.  F. BURCHELL  2,293,696
METHOD OF MAKING DESIGNS
Filed March 29, 1940  3 Sheets-Sheet 3
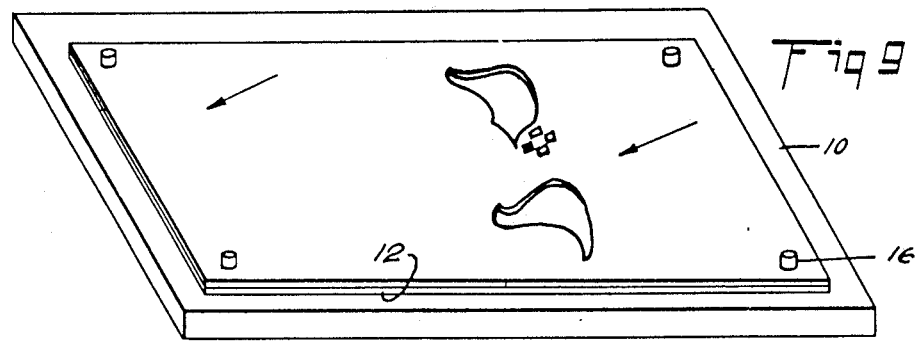
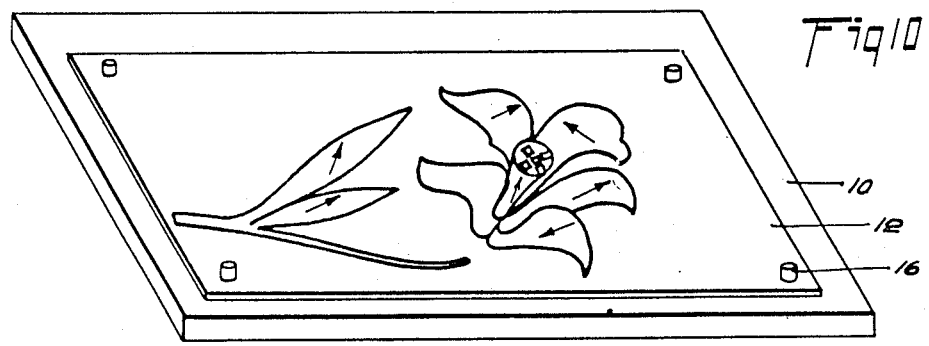
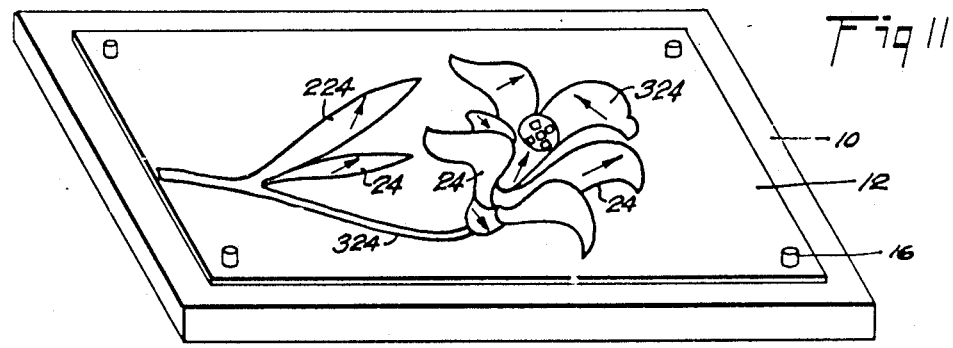
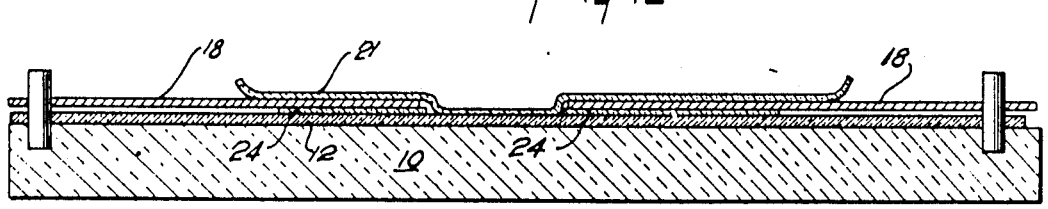
INVENTOR.
Ford Burchell
BY Brown & Jones
ATTORNEYS Patented Aug. 25, 1942

2,293,696

UNITED STATES PATENT OFFICE 2,293,696

METHOD OF MAKING DESIGNS

Fford Burchell, Port Chester, N. Y., assignor of twenty-three one-hundredths to John Q. A. Halloway, Brooklyn, N. Y., and one-tenth to James J. Ryan, New York, N. Y.

Application March 29, 1940, Serial No. 326,549

15 Claims. (Cl. 41—34)

This invention relates to a method of making designs, and more specifically to a method of building laminated designs.

In general, it is an object of the invention to provide a method of the character described, which will efficiently perform the purposes for which it is intended, which can be expeditiously, conveniently and safely carried out; and the apparatus for which is simple and economical of construction and can be readily manufactured and assembled.

Another object of the invention is to provide a method of building up a laminated design and for the registering of the component parts of a design, whereby the contours of any one lamination or portion thereof are brought to the attention of the worker, and to do so while permitting the worker to fit one lamination into intricacies and/or inacuracies of design in another lamination, and to accomplish these ends by optical and/or mechanical means; to provide such a method wherein the excess material in any lamination is quickly removed as a whole and/or without danger of simultaneously removing a portion of another lamination; to provide such a method in which the optical directions of the several laminations may be quickly and respectively oriented as desired; and to provide a method of duplicating, with great multiplicity, a design and especially with discrete components originally non-fluid.

Other objects of the invention will in part be obvious and will in part appear hereinafter.

The invention accordingly comprises the several steps and the relation of one or more of such steps with respect to each of the others, all as exemplified in the following detailed disclosure, and the scope of the application of which will be indicated in the claims.

For a fuller understanding of the nature and objects of the invention, reference should be had to the following detailed description, taken in connection with the accompanying drawings, in which:

Figure 1 is a perspective view of a desired sketched design on a sheet carried by a support;

Fig. 2 is a perspective view of the supported sheet of Fig. 1 with no lamination thereon and covered by a stencil;

Fig. 3 is a view similar to Fig. 2 with a lamination on top of the stencil;

Fig. 4 is a view with the stencil removed, the parts of the lamination remaining which were attached to the sheet through the stencil openings, the sketched design not being shown for purposes of clarity;

Fig. 9 shows the fourth stencil on the sheet;

Fig. 10 is a view similar to Figs. 6 and 8 but with four sets of design elements;

Fig. 11 shows the final design after further design elements have been added by similar steps; and Fig. 12 is a cross-section of the device shown in Fig. 5.

Figure 5:
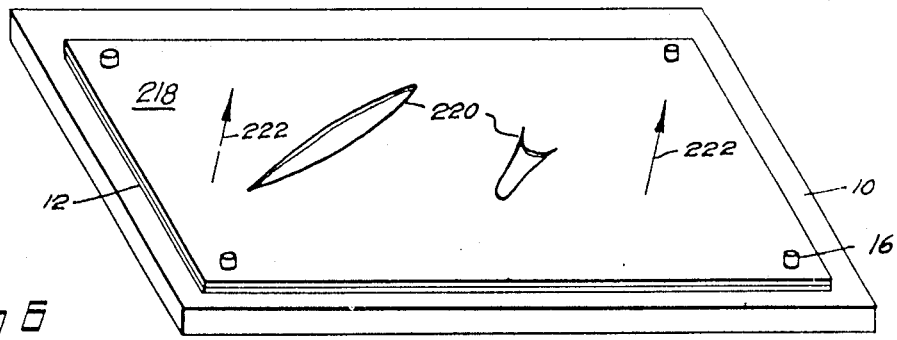
Fig. 5 is a similar view of a second stencil imposed on the original sheet and the first set of laminar design elements.

The product contemplated by the present invention comprises a mosaic-like design superposed on a foundation sheet and having design elements which are non-fluid before they are applied and which may or may not be alike optically.

The particular final product described below appears in non-polarized transmitted light to be a sheet having varying thicknesses, or a uniform thickness, which close observation may show to have a design. The design may or may not be emphasized by shading applied to the sheet. The one or more layers which give the design are of doubly refracting material. When the product is viewed through a plane-polarizing analyzer in light which is polarized before passing through the product, the latter appears colored, the colors differing with its thickness and for any one thickness. If the plane of polarization of the incident light is rotated through 180 degrees, the color of any one thickness changes from a given color to its own complementary color and back to the original color. Simultaneously, the different color of another thickness changes to its complement and back. Therefore, at any one time, two parts of the design having the same thickness differ in color if the doubly refracting axes of one part are at an angle with those of the otner part. The product, so illuminated with light of constantly changing polarization, gives a constantly changing color pattern. The results are quite spectacular and strange optical illusions of motion are obtained. The undersigned has made them by sticking a doubly refracting lamination to a foundation sheet, the optic axes being in a predetermined direction. Portions of the lamination were removed to leave a part of a design. Some of the removed portions were necessarily large and difficult to disengage. In order to attach other portions of the first thickness above the foundation, e. g., with optical axes in different directions, a second lamination was laid down on the foundation and the remaining portions of the first lamination. The undesired parts of the second lamination were then removed with the added trouble that sometimes the removal of a portion of the second lamination also removed an underlying part of the first lamination.

The present invention contemplates a method whereby the above difficulties, as well as others, are obviated and the process improved in other respects, and whereby such a design may be constructed of non-fluid components whether doubly refracting or not.

In the drawings, 10 denotes a workman's table or base on which is placed the translucent foundation sheet 12 which may be clear or frosted. If desired the table 10 may be translucent. A cellulose acetate sheet may be used. On the sheet there may or may not be printed, or otherwise applied, the design 14, and/or shading therefor, which is to be built up in laminations. Any suitable means may be availed of to position the sheet. There may be posts 16 in the base over which holes in the sheet fit. Design 14 may be applied to table 10.

A stencil 18 is laid on sheet 12 and similarly positioned by posts 16. It has certain openings 20 which correspond with certain parts of the design. A lamination 21 of doubly refracting material such as "Cellophane" is adhesively secured to the top of the stencil and through the openings therein to the top of sheet 12. The optical directions of lamination 21 are known and they are oriented in a predetermined direction by means of one or more indicia 22, printed or impressed on or otherwise associated with the stencil. Adhesive may have been spread over the underside of the lamination before superposition or over the sheet 12 or the portion thereof visible through the opening in the stencil. The lamination is then scored, fractured or broken along the periphery of the openings 20. The stencil, with parts of the lamination attached to it, is lifted off, leaving (see Fig. 4) the foundation 12 with design elements 24 from the lamination secured to it. The arrow shown on any one of those elements merely indicates, for purposes of this description, the direction of the optic axis of the material of those elements. The stencil may be of paper and, having been used, may be thrown away.

The successive applications of laminations for the purpose of depositing various elements of the design in the same or different planes may be carried out on the same base 10 or preferably on a separate base for each application. In the latter case the foundation sheet 12 with attached elements is moved from base to base as the method proceeds and each base may have applied to it in some convenient fashion only so much of the complete design as it is to be applied to the foundation sheet 12 while it is on that respective base. Even those peripheries of the new part of the design which are in registry with already laid down parts of the design need not be shown on that base or table 10 above which the new part or parts of the design are attached to the foundation sheet 12.

Figure 6:
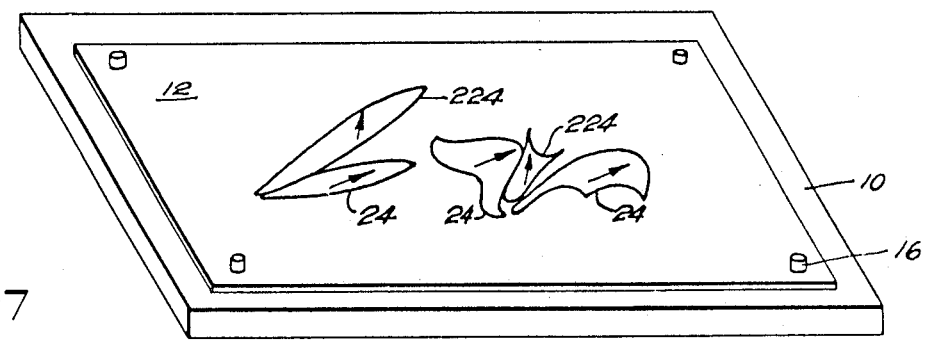
Fig. 6 is a similar view, with the second stencil removed, after an operation similar to that shown in Fig. 3, of the supported sheet and the two sets of laminar design elements attached thereto.

Similarly, a second stencil, 218, is next laid down (see Fig. 5). It has openings 220 which correspond to other portions of the design 16. A second lamination is placed on the second stencil and oriented optically by means of indicia 222 on stencil 218. It is fractured along the peripheries of openings 220. Stencil 218 is removed, leaving design elements 224 on foundation 12 along with the previously applied design elements 24 (see Fig. 6). The two sets have their respective optic axes at an angle with each other. The openings 220 may be slightly larger than the corresponding portions of the design. This facilitates the cutting of overlaid laminations, particularly where one of the portions of the design is juxtaposed to design element 24 previously applied, as in that case the edge of the latter is visible through opening 220 and the operator may follow it as a guide so that a design element 224 may fit exactly along any mistake or irregularity in the adjacent element 24. The underlying element 24 may be made more evident through opening 220 by illuminating it from below with polarized or non-polarized light.

Figure 7:
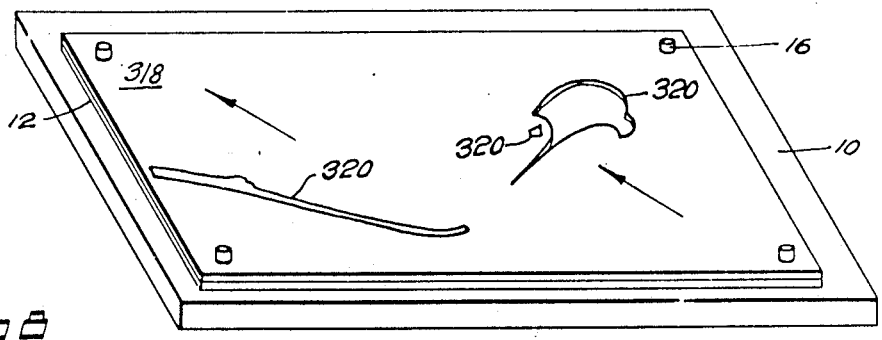
Fig. 7 is a similar view of another operation similar to that shown in Figs. 2 and 5.
Figure 8:
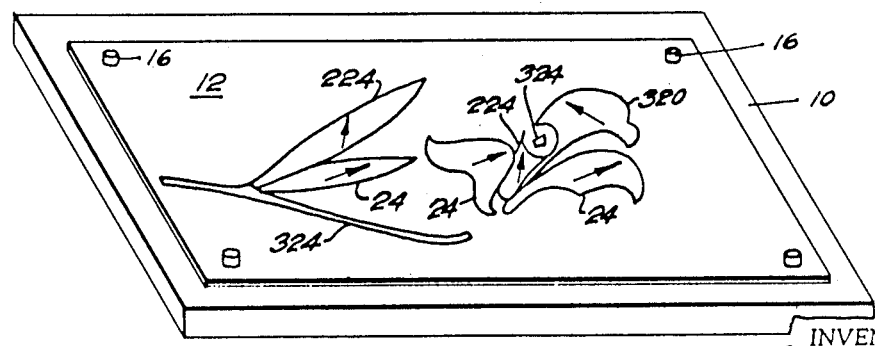
Fig. 8 is a view silimar to Fig. 6 but at a time after Fig. 7 when there are three sets of laminar design elements attached to the sheet.

The steps of the last paragraph are repeated with stencil 318 having openings 320 and further elements 324 are applied thereby (see Figs. 7 and 8).

Figs. 9 and 10 show two further similar steps. There may be any number of such pairs of steps. The final product is shown in Fig. 11.

In order to obtain certain color combinations, certain of the design elements may be intentionally overlaid. The stencils may be of metal and have sharp edges at their openings.

When the elements of the design are complicated, or for other reasons, a single operator may carry out only one pair of steps on successive products, other operators carrying out other pairs of steps on other tables 10.

Since certain changes in carrying out the above process may be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of the character described comprising superimposing a stencil upon a sheet of material, superimposing over the stencil a lamination having an adhesive lower face so that the lamination adheres to the stencil and, through an opening in the stencil, to the sheet, removing the stencil and leaving only the portion of the lamination adhering to the sheet superimposed thereon.

2. A method of the character described comprising superimposing a stencil upon a sheet of translucent material, superimposing over an opening of the stencil a doubly-refracting lamination larger than the opening causing the lamination to adhere, through an opening in the stencil, to the sheet, removing the stencil and leaving only the portion of the lamination adhering to the sheet superimposed thereon.

3. A method of the character described comprising superimposing a stencil upon a sheet of material, superimposing over an opening of the stencil a lamination larger than the opening, causing the lamination to adhere, through an opening in the stencil, to the sheet, removing the stencil and leaving only the portion of the lamination adhering to the sheet superimposed thereon, and repeating the before-mentioned steps with a different stencil, the openings in the stencils forming at least part of a single design.

4. A method of the character described comprising superimposing a stencil upon a sheet of material, superimposing over an opening of the stencil a lamination larger than the opening, causing the lamination to adhere, through an opening in the stencil, to the sheet, removing the stencil and leaving only the portion of the lamination adhering to the sheet superimposed thereon, and repeating the before-mentioned steps with a different stencil, the openings in the stencils forming at least part of a single design, the openings in the second stencil being somewhat larger than the corresponding part of the entire design.

5. A method of the character described comprising superimposing a stencil upon a sheet of translucent material, superimposing over an opening of the stencil a doubly refracting lamination larger than the opening, causing the lamination to adhere, through an opening in the stencil, to the sheet, removing the stencil and leaving only the portion of the lamination adhering to the sheet superimposed thereon, and repeating the before-mentioned steps with a different stencil, the openings in the stencils forming at least part of a single design.

6. A method of the character described comprising superimposing a stencil upon a sheet of cellulose acetate, superimposing over an opening of the stencil a lamination of "Cellophane" larger than the opening, causing the lamination to adhere, through an opening in the stencil, to the sheet, removing the stencil and leaving only the portion of the lamination adhering to the sheet superimposed thereon.

7. A method of the character described comprising superimposing a stencil upon a sheet of material, superimposing over an opening of the stencil and with a predetermined optical orientation a lamination larger than the opening, causing the lamination to adhere, through an opening in the stencil, to the sheet, removing the stencil and leaving only the portion of the lamination adhering to the sheet superimposed thereon.

8. A method of the character described comprising superimposing a stencil upon a sheet of material, superimposing over an opening of the stencil and with a predetermined optical orientation a lamination larger than the opening, causing the lamination to adhere, through an opening in the stencil, to the sheet, removing the stencil and leaving only the portion of the lamination adhering to the sheet superimposed thereon, the orientation being determined by an indicium associated with the stencil.

9. A method of the character described comprising superimposing a paper stencil upon a sheet of material, superimposing over an opening of the stencil a lamination of "Cellophane" larger than the opening, causing the lamination to adhere, through an opening in the stencil, to the sheet, removing the stencil and leaving only the portion of the lamination adhering to the sheet superimposed thereon.

10. A method of the character described comprising superimposing a stencil upon a sheet of material, superimposing over an opening of the stencil and with a predetermined optical orientation a lamination larger than the opening, causing the lamination to adhere, through an opening in the stencil, to the sheet, removing the stencil and leaving only the portion of the lamination adhering to the sheet superimposed theron, and repeating the before-mentioned steps with a different stencil, the openings in the stencils forming at least part of a single design, the optical orientation of the second lamination being at an angle to the first-mentioned orientation.

11. A method of the character described comprising superimposing a stencil upon a sheet of material, superimposing over an opening of the stencil and with a predetermined optical orientation a lamination, causing the lamination to adhere, through an opening in the stencil, to the sheet, removing the stencil and leaving only the portion of the lamination adhering to the sheet superimposed thereon, and repeating the before-mentioned steps with a different stencil, the openings in the stencil forming at least part of an entire design, the optical orientation of the second lamination being at an angle to the first-mentioned orientation, the orientations being determined by respective indicia associated with the stencils.

12. A method of the character described comprising superimposing a stencil upon a sheet of material, superimposing over the stencil a lamination, causing the lamination to adhere, through an opening in the stencil, to the sheet, fracturing the lamination along a line determined by the boundary of the opening in the stencil, removing the stencil and leaving only the portion of the lamination adhering to the sheet superimposed thereon.

13. A method of the character described comprising superimposing a stencil upon a sheet of material, superimposing over the stencil a lamination, causing the lamination to adhere, through an opening in the stencil, to the sheet, fracturing the lamination along a line determined by the boundary of the opening in the stencil, removing the stencil and leaving only the portion of the lamination adhering to the sheet superimposed thereon while viewing the lamination in transmitted polarized light.

14. A method of the character described comprising superimposing a stencil upon a sheet of material, superimposing over the stencil a lamination, causing the lamination to adhere, through an opening in the stencil, to the sheet, fracturing the lamination along a line determined by the boundary of the opening in the stencil, removing the stencil and leaving only the portion of the lamination adhering to the sheet superimposed thereon while viewing the lamination in transmitted light.

15. A method of the character described comprising superimposing a stencil upon a sheet of material, superimposing on an opening of the stencil a lamination larger than the opening, causing the lamination to adhere, through an opening in the stencil, to the sheet, removing the stencil and leaving only the portion of the lamination adhering to the sheet superimposed thereon.

FFORD BURCHELL.

CERTIFICATE OF CORRECTION.

Patent No. 2,293,696. August 25, 1942.

FFORD BURCHELL.

It is hereby certified that error appears in the printed specification of the above numbered patent requiring correction as follows: Page 2, first column, line 70, for "as it is" read --as is--; page 3, second column, line 19, claim 11, strike out "an opening of"; line 27, same claim, for "stencil forming" read --stencils forming--; and that the said Letters Patent should be read with this correction therein that the same may conform to the record of the case in the Patent Office.

Signed and sealed this 13th day of October, A. D. 1942.

(Seal)

Henry Van Arsdale,
Acting Commissioner of Patents.